(12) United States Patent
Chanda et al.

(10) Patent No.: US 11,522,835 B2
(45) Date of Patent: Dec. 6, 2022

(54) CONTEXT BASED FIREWALL SERVICE FOR AGENTLESS MACHINES

(71) Applicant: VMware, Inc., Palo Alto, CA (US)

(72) Inventors: Arijit Chanda, San Jose, CA (US);
Sirisha Myneni, Santa Clara, CA (US);
Arnold Poon, San Mateo, CA (US);
Kausum Kumar, Los Gatos, CA (US);
Dhivya Srinivasan, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 287 days.

(21) Appl. No.: 16/027,086

(22) Filed: Jul. 3, 2018

(65) Prior Publication Data

US 2020/0014662 A1 Jan. 9, 2020

(51) Int. Cl.
*H04L 29/06* (2006.01)
*H04L 9/40* (2022.01)
*H04L 41/5041* (2022.01)
*H04L 65/1033* (2022.01)
*G06F 9/455* (2018.01)

(52) U.S. Cl.
CPC ...... *H04L 63/0263* (2013.01); *G06F 9/45558* (2013.01); *H04L 41/5041* (2013.01); *H04L 63/029* (2013.01); *H04L 65/1036* (2013.01); *G06F 2009/45587* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 9,148,408 B1* | 9/2015 | Glazemakers | H04L 63/029 |
| 10,686,625 B2* | 6/2020 | Cidon | H04L 61/25 |
| 2005/0229246 A1* | 10/2005 | Rajagopal | H04L 63/0236 726/14 |
| 2006/0015935 A1* | 1/2006 | Dixon | H04L 63/0218 726/11 |
| 2010/0333165 A1* | 12/2010 | Basak | H04L 63/0263 726/1 |
| 2012/0054625 A1* | 3/2012 | Pugh | H04L 67/02 715/736 |
| 2013/0268997 A1* | 10/2013 | Clancy, III | H04L 63/0227 726/1 |
| 2014/0173076 A1* | 6/2014 | Ravindran | H04L 67/327 709/223 |

(Continued)

OTHER PUBLICATIONS

Kevin Lees, "Operationalizing VMware NSX", Vmware press, 2017, 1-94. (Year: 2017).*

(Continued)

*Primary Examiner* — Jeffery L Williams

(57) ABSTRACT

A system and method for performing firewall operations on an edge service gateway virtual machine that monitors traffic for a network. The method includes detecting, from a directory service executing on a computing device, a login event on the computing device, obtaining, from the detected login event, login event information comprising an identifier that identifies a user associated with the login event, storing the login event information as one or more context attributes in an attribute table, and applying a firewall rule to a data message that corresponds to the one or more context attributes.

20 Claims, 6 Drawing Sheets

(56) References Cited

U.S. PATENT DOCUMENTS

| | | | | |
|---|---|---|---|---|
| 2014/0201807 A1* | 7/2014 | White | ............... | G06F 21/577 |
| | | | | 726/1 |
| 2014/0201814 A1* | 7/2014 | Barkie | ............... | H04L 63/0892 |
| | | | | 726/4 |
| 2014/0281030 A1* | 9/2014 | Cui | ............... | H04L 43/028 |
| | | | | 709/244 |
| 2018/0181763 A1* | 6/2018 | Gunda | ............... | G06F 9/45558 |
| 2018/0183759 A1* | 6/2018 | Gunda | ............... | G06F 21/50 |
| 2018/0183761 A1* | 6/2018 | Gunda | ............... | H04L 63/0254 |
| 2018/0295036 A1* | 10/2018 | Krishnamurthy | ... | G06F 9/45558 |
| 2019/0089677 A1* | 3/2019 | Ashley | ............... | H04L 63/0263 |
| 2019/0089678 A1* | 3/2019 | Lam | ............... | H04L 63/0263 |
| 2019/0132289 A1* | 5/2019 | Hulick, Jr. | ............... | H04L 63/0245 |
| 2019/0280979 A1* | 9/2019 | Jain | ............... | H04L 12/56 |
| 2019/0334880 A1* | 10/2019 | Wang | ............... | H04L 63/20 |
| 2019/0394089 A1* | 12/2019 | Barrett | ............... | H04L 67/34 |
| 2020/0014662 A1* | 1/2020 | Chanda | ............... | H04L 63/0263 |
| 2020/0036608 A1* | 1/2020 | Chanda | ............... | H04L 41/22 |
| 2020/0106745 A1* | 4/2020 | Glazemakers | ...... | H04L 12/4633 |
| 2020/0228444 A1* | 7/2020 | Parasmal | ............... | H04L 67/322 |
| 2020/0235999 A1* | 7/2020 | Mayya | ............... | H04L 43/0882 |
| 2020/0336511 A1* | 10/2020 | Martinez De La Cruz | ............... | |
| | | | | H04L 63/166 |
| 2021/0006490 A1* | 1/2021 | Michael | ............... | H04L 43/0864 |

OTHER PUBLICATIONS

Cisco, "Cisco Virtual Security Gateway for Nexus 1000V Series Switch Command Reference", Release 4.2, Cisco Systems, 2013, p. 1-380. (Year: 2013).*

VMware, "NSX Administration Guide", Vmware press, May 2018, p. 1-477. (Year: 2018).*

Roie Ben Haim, "NSX Identity Firewall—Deep Dive", Nov. 2016, www.routetocloud.com, p. 1-22. (Year: 2016).*

* cited by examiner

CONTEXT BASED FIREWALL SERVICE FOR AGENTLESS MACHINES

CROSS-REFERENCE TO RELATED APPLICATIONS

U.S. patent application Ser. No. 15/836,888, "Context Based Firewall Services for Data Message Flows for Multiple Concurrent Users on One Machine," filed Dec. 10, 2017, is hereby incorporated by reference in its entirety.

BACKGROUND

Typical firewall systems are built to filter traffic based on Internet Protocol (IP) addresses, source and destination ports, and protocol types. In contrast, an identity-based firewall filters traffic and/or control access to a digital product or service based on an authenticated identity of an individual or system. This allows organizations to enable specific users or groups of users to access a variety of digital services or resources using similar credentials or different credentials, ensuring an accurate match between what users are entitled to access according to policy and what they are actually able to access, while also imposing constraints such as company, device, location and application type.

When a user logs into a desktop or virtual machine (VM), a directory service such as Active Directory or other LDAP (lightweight directory access protocol) system authenticates the user and can associate the IP address of the desktop with the user's authenticated identity. This association can then be used to enforce a firewall policy that is associated with the user by translating the user's identity in the policy with the network address (e.g., IP or MAC address) of the system that the user just logged into. Thereafter, any applicable access policies associated with that user may be applied to data messages associated with that network address using a firewall service. However, since conventional identity-based firewall systems utilize network address to identify a user and enforce user-based firewall policies, a problem arises when multiple users are logged into the same computing device, as the same network address is now associated with multiple users.

To overcome the problems described above of applying identity-based firewall polices when multiple users login through the same computing device, other systems have also captured a client's identification (ID) during log in and have applied the client ID that is captured at log in with an IP address to distinguish one user's data messages from another user logged into the same computing device. However, in order for these systems to capture a client's ID at log in and the client's ID for every network connection initiated at a computing device, a guest agent executing on the computing device is needed to provide, not only the indication that a user login has been executed, but also capture the user's ID when the user logs in or initiates the network connection.

SUMMARY

One or more embodiments disclosed herein provide a system that includes a computing device executing a directory service thereon, a network, and a plurality of edge service gateway (ESG) virtual machines (VMs) that monitor traffic for the network as well as perform other gateway operations such as Layer 3 routing, address translation, etc. One or more of the ESG VMs include an event log monitor configured to detect, from the directory service, a login event from a user's computing device, and obtain, from the detected login event, login event information including an identifier that identifies the user. Each of the one or more ESG VMs further include a context engine configured to receive the login event information from the event log monitor, and store the login event information as one or more context attributes in an attribute table. Each of the one or more ESG VMs further include a firewall engine configured to determine whether a data message received by the ESG VM corresponds to the one or more context attributes stored in the attribute table, and enforce a firewall rule on the data message based on the determining.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and the Drawings.

DETAILED DESCRIPTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a novel architecture for enforcing identity-based firewall policies on an edge service gateway (ESG) virtual machine (VM). The ESG VM captures a user's ID when the user logs in to a network without a need for an agent to be executing on the user's computing device. The ESG VM uses the user's ID (and other contextual information obtained from the login event) to enforce identity-based firewall polices on the ESG VM for the network. In some embodiments, the ESG VM supports other services like context-based load balancing operations to distribute data message flows from the ESG VM to different destination or service nodes, dynamic host configuration protocol, network address translation, and domain name server.

Further, the network may include a plurality of ESG VMs (e.g., a cluster of ESG VMs). Thus, the ability to enforce firewall policies for the network is very scalable and efficient. For example, different firewall engines on corresponding ESG VMs in an ESG VM cluster can enforce the same set of firewall rules. Thus, different firewall engines secure data messages that are forwarded by the ESG VMs. Advantageously, to implement a new firewall rule, these firewall rules need only be published to each of the ESG VMs in the ESG VMs cluster (e.g., instead of to every host in a virtual network). That is, because incoming data messages are first routed to one of the ESG VMs prior to reaching a destination, and each of the ESG VMs enforce the same firewall rules, these firewall rules can be published to all of the ESG VMs very quickly, saving publishing costs and processing time.

As used herein, data messages refer to a collection of bits sent across a network as a unit. It should be understood that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
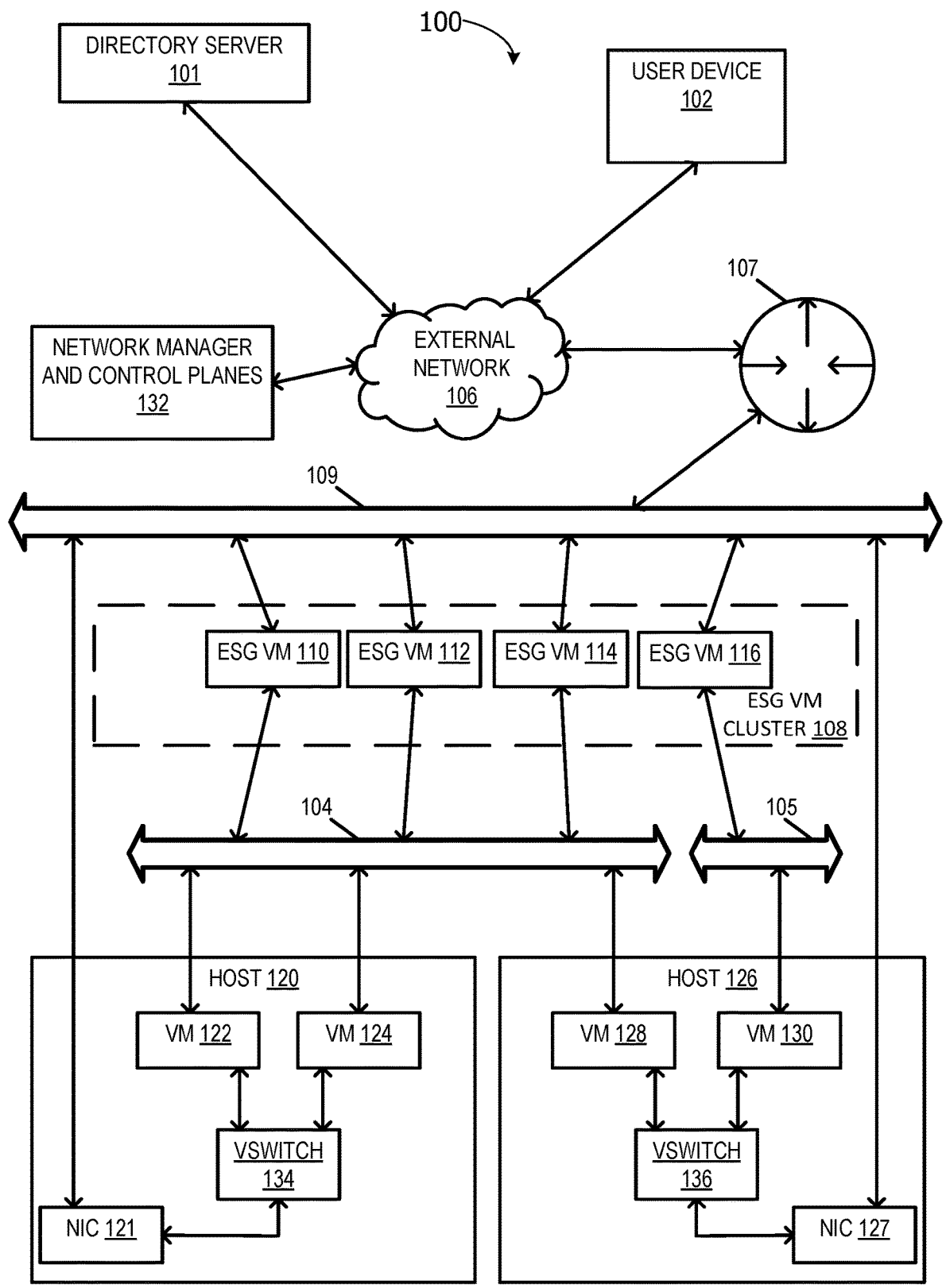
FIG. 1 is a block diagram that illustrates a system for performing identity-based firewall operations, according to embodiments of the present disclosure.

FIG. 1 illustrates a system 100 for performing identity-based firewall operations. The system 100 includes a directory server 101, a user device 102 connected to logical overlay networks 104, 105 via external network 106, which may be a LAN (local area network), a WAN (wide area network), the Internet, or the like. Directory server 101 provides a centralized and standardized system that automates network management of user data and security, and authenticates and authorizes a user accessing logical overlay network 104 or 105 through the user device 102. One example of directory server 101 is Active Directory®, available from Microsoft Corp. of Redmond, Wash.

Logical overlay network 104, also referred to as a software defined network, is a network abstraction that is decoupled from the underlying physical network infrastructure. When a packet enters logical overlay network 104 via an ESG VM, it is "tunneled" or encapsulated for communication to a destination VM 122, 124, 128, or 130 on one of target hosts 120, or 126. The target host 120, 126 decapsulates the packet using a tunnel endpoint at the host. The target host then passes the original inner packet to the destination VM. Each ESG VM and host receive routing, tunneling, filtering, and forwarding information from management and control planes 132.

A packet from user device 102 passes through external network 106 to physical router 107. Based on the destination IP address, physical router 107 may apply a VLAN tag corresponding to a tenant as described in further detail below. The packet is then forwarded to ESG VM cluster 108 where it arrives at one of ESG VMs 110, 112, 114, 116. The ESG VM, in accordance with routing tables that may be learned and/or configured by network manager and control planes 132. The ESG VM would create a new Layer 2 header corresponding to the logical Layer 2 address of the destination VM on its logical overlay network, e.g., logical network 104 (or the next hop towards the destination VM, e.g., the L2 address of logical router 302, shown in FIG. 3.

In a logical view, the packet passes from the ESG VM to the logical overlay network 104 to the destination VM 122, 124, or 128. However, to accomplish this in the physical world, ESG VM or the hypervisor of the host it resides on (not shown) will encapsulate that packet with an outer L3 header corresponding to the physical network address of the destination host, e.g., host 120. An outer L2 header is also added corresponding to the next hop (not shown) on Layer 3 physical network 109, which may be the destination host. The destination host receives the packet at its physical NIC 121 and decapsulates the original packet which is then passed to the destination VM, e.g., VM 122 via the virtual switch configured on host 120 by network manager and control planes 132.

The user device 102 may be a physical computing device, such as a desktop computer, a smart phone, a laptop computer, or a tablet. In other embodiments, the user device 102 may be a virtual computing device, such as a VM or a container, which runs on top of a host operating system without a need for virtualization software or separate operating system. However, as described in further detail below, whether the user device 102 is a physical computing device or a virtual computing device, user device 102 is external to logical overlay network 104, and may therefore reside on a physical network or separate logical network. Additionally, user device 102 may not include a guest agent executed thereon that identifies and/or forwards login information of a user accessing a network.

Virtual network 104 includes an ESG VM cluster 108 that includes a plurality of ESG VMs (e.g., ESG VM 110, ESG VM 112, ESG VM 114, and ESG VM 116). In some embodiments, one or more of the ESG VMs 110-116 are running on a VM inside a datacenter or in a cloud. In addition, the while each of the ESG VMs 110-116 are described herein as running on a VM, an ESG may run on other form factors other than a VM, such as a container or bare metal server. Further, although not shown, the ESG VMs 110-116 communicate with physical routers. Logical overlay network 104 may be connected to a plurality of VMs 122, 124, 128, 130, which reside on hosts 120 and 126. Each hosts 120, 126 are physical computing devices that execute one or more workloads, such as VMs 122, 124, 128, 130 and other VMs not shown. The VMs 122-130 create an abstraction of physical computing resources, such as a processor and memory, of a host (e.g., the hosts 120 and 126) executing the VM and executes a "guest" operating system, which, in turn, executes one or more software applications. The abstracted resources may be functionally indistinguishable from physical resources from the perspective of the guest operating system and software applications.

Network manager and control planes 132 is software that executes on one or more servers. In one embodiment, network manager and control planes 132 comprise a network manager configured to carry out administrative tasks including generating an interface that allows administrators to create context-based firewall rules and/or policies for firewall engines (e.g., firewall engine 208 in FIG. 2). Once the high-level firewall policies are defined in the network manager 132, the network manager publishes the firewall policies to each of the ESG VMs 110-116 in the ESG VM cluster 108 via a control plane (not separately shown). The control plane may comprise a cluster of controllers that receive policy directives from the manager and implement them on the hosts and ESGs.

Figure 2:
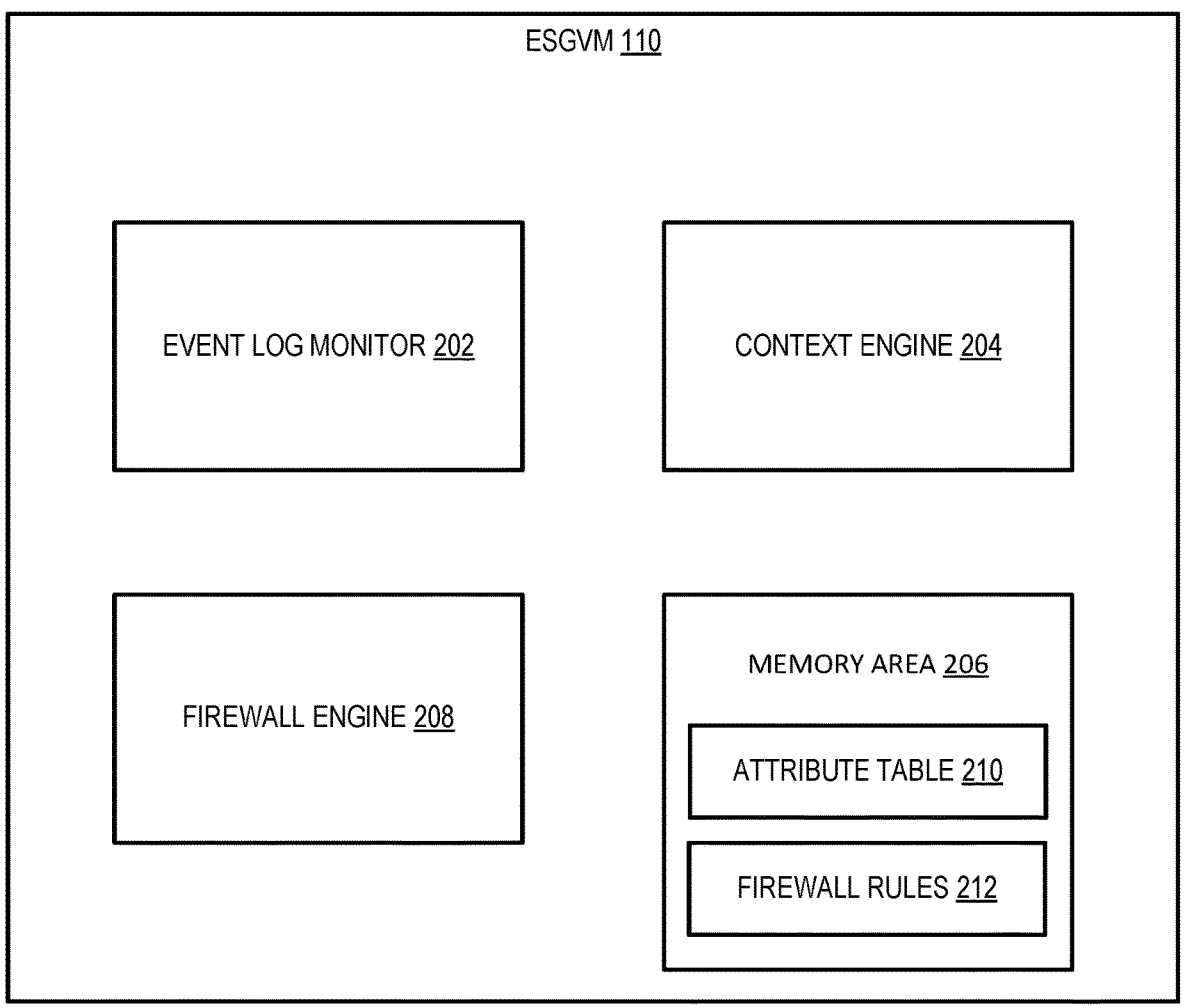
FIG. 2 is a block diagram of an edge service gateway virtual machine, according to embodiments of the present disclosure.

With reference now to FIG. 2, a block diagram of the ESG VM 110 is provided. While components of the ESG VM 110 are provided in FIG. 2, it should be understood that the ESG VM 110 is representative of each of the ESG VMs 112-116. As shown in FIG. 2, the ESG VM 110 includes an event log monitor 202, a context engine 204, memory area 206 and firewall engine 208. It should be understood that ESG VM 110 would generally include many other components for additional gateway functionality such as network ports and packet forwarding functions, as well as interfaces such as APIs for interacting with the control plane, but ESG VM 110 is simplified here for explanatory purposes.

The event log monitor 202 accesses directory server 101 (shown in FIG. 1) to monitor/poll directory server 101 for log in events on user device 102. That is, given that user device 102 may not have a guest agent executing thereon to provide user login information when a user logs into the logical overlay network 104 through directory server 101, event log monitor 202 executing ESG VM 110 detects the log in event for user device 102. Upon detecting the log in event, event log monitor 202 collects context attributes pertaining to the log in event and provides the context attributes to context engine 204. These context attributes include one or more of the following: a five-tuple identifier (i.e., source port and IP address, destination port and IP address, and protocol) of the requested network connection, a process identifier of a process requesting the network connection, a user ID, and a group ID (e.g., an activity directory (AD) identifier) the user is a member of, and the like.

Context engine 204 stores the context attributes that it obtains from the event log monitor in attribute table 210 in memory area 206. In some embodiments, context engine 204 stores context attributes with one or more network event identifiers and/or process identifiers. For example, in some embodiments, context engine 204 stores context attributes for a new log in event with a process identifier, or with a reference to this identifier. Context engine 204 in some embodiments stores the collected context attributes with a five-tuple identifier of the log in event, or with a reference to this five-tuple identifier. The data messages corresponding to this log in event will also use this five-tuple identifier, and hence one or more portions of the supplied five-tuple identifier can be used (e.g., by firewall engine 208) to identify the context attributes associated with the data messages sent from user device 102 and received by the ESG VM 110.

In some embodiments, context engine 204 stores only the context attributes that are relevant for firewall rules. In other words, in these embodiments, context engine 204 obtains each attribute collected by event log monitor 202 with a list of attributes used by firewall engine 208, and discards each collected attribute that is not used by firewall engine 208. The context engine 208 then stores only the subset of collected attributes (in the set of collected attributes) that is being used by firewall engine 208 in attribute table 210.

Firewall engine 208 performs firewall operations on data messages received by the ESG VM 110. These firewall operations are based on firewall rules stored in the firewall rules 212 in the memory area 206. Some of the firewall rules 212 are defined purely in terms of layer 2-layer 4 attributes, e.g., in terms of five-tuple identifiers. Other of the firewall rules 212 are defined in terms of context attributes that can include one or more of the collected context attributes, such as application names, application versions, user ID, group ID, and the like. Yet still other of the firewall rules 212 are defined in terms of both L2-L4 parameters and context attributes. In some embodiments, each rule in the firewall rules 212 has a rule identifier and an action parameter set, as explained further below with reference to FIG. 5.

In some embodiments, the firewall engine 208 can allow, block, or re-route data message flows based on any number of context attributes, because the firewall rules 212 can be identified in terms of any combination of the collected context attributes. For example, the firewall engine 208 can block all email traffic from a particular email application when the user is part of a particular user group, and one firewall rule specifies that data messages should be blocked when the data message is associated with the particular group ID, the traffic type is identified as email, and the application name is the particular email application. Similarly, these context-based firewall rules can block data message flows associated with video conferences, online video viewing, or use of old versions of software.

When firewall engine 208 receives a data message and inspects a header, firewall engine 208 refers to attribute table 210 to match a data message identifier (e.g., a five-tuple identifier) and/or context attributes associated with the data message with one or more context attributes stored in attribute table 210. As mentioned above, context engine 204 stores the context attributes along with one or more identifiers (e.g., a five-tuple identifier) or a process identifier. In this manner, firewall engine 208 can identify the context attributes for each new date message that it receives by searching the attribute table 210 for a context record that has matching identifiers and/or matching context attributes.

After identifying the context attributes for the data message, firewall engine 208, in some embodiments, performs its service operation based on firewall rules 212 that correspond to the context attributes that were accessed from the data message or accessed from attribute table 210 using the data message identifiers and/or the context attributes from the data message.

By enabling firewall engine 208 to enforce identity-based firewall polices as described herein, firewall engine 208 can differentiate data message flows for two different processes that run concurrently on user device 102 that used different login/administrative credentials. For example, since context engine 204 collects the user and group identifiers for each data message flow when each flow starts (e.g., at login), the firewall engine is able to distinguish each data message flow using the user IDs and/or the group IDs.

In some embodiments, a rule identifier of the firewall rules 212 can be defined in terms of one or more context attributes that are not L2-L4 header parameters (e.g., are L7 parameters, process identifiers, user identifiers, group identifiers, application hashes or signatures). However, a rule identifier can also include L2-L4 header parameters and/or one or more parameters specified in terms of an individual value or a wildcard value, and can include a set of individual values or a group identifier, such as a security group identifier, a compute construct identifier, and/or a network construct identifier, and the like.

In some embodiments, the firewall rules 212 are defined in a hierarchical manner to ensure that when a message's attribute subset matches multiple rules, a message rule check will match a higher priority rule before matching a lower priority rule. Also, in some embodiments, the firewall rules 212 contain a default rule that specifies a default action for any message rule check that cannot identify any other service rules. This default rule will be a match for all possible attribute subsets and ensures that the firewall rule engine 204 will return an action for all received data messages. In some embodiments, the default rule will specify no service.

Multiple messages can have one or more of the same message identifier attributes, e.g., when the messages are part of one flow that is associated with one communication session between two machines. Accordingly, after matching a data message with a firewall rule in firewall rules 212 based on the data message's identified context attributes, firewall engine 208 of some embodiments stores the firewall rule (or a reference to the firewall rule) in a cache (not shown), so that the firewall engine 208 can quickly use this firewall rule for subsequent data messages of the same flow.

In some embodiments, the cache stores the firewall rule, or a reference to the firewall rule that the firewall engine 208 identifies for different message identifier sets (e.g., for different five-tuple identifiers that identify different data message flows). In some embodiments, the cache stores each firewall rule, or reference to the firewall rule, with an identifier (e.g., a flow's five-tuple identifier). Thus, before checking with attribute table 210 and firewall rules 212 regarding a particular data message, firewall engine 208 of some embodiments checks the cache to determine whether this storage has previously identified a firewall rule for a particular data message flow. If not, firewall engine 208 identifies the context attributes for the data message flow and then checks attribute table 210 and firewall rules 212 for a firewall rule that matches the identified context attributes and/or the five-tuple identifier. However, when the cache has an entry for the particular data message, firewall engine 208 performs a firewall operation based on the corresponding cached firewall rule.

In some embodiments, a deep packet inspection is performed on a data message flow at the direction of the firewall engine 208. Specifically, when the firewall engine 208 receives a new data message that is part of a new data message flow, the firewall engine 208 in some embodiments directs a deep packet inspection module (not shown) to inspect that new data message and one or more of the next few data messages in the same flow. Based on this examination, a type of traffic (i.e., the application on a wire) that is being sent in this data message flow is identified, and an ID for this traffic type can be created and stored in the attribute table 210 based on that flow's five-tuple identifier.

In another embodiment, the ESG VM 110 enables context awareness for services like context-based load balancing operations to distribute data message flows from the ESG VM 110 to different destination or service nodes, dynamic host configuration protocol, network address translation, and domain name server using the event log monitor 202 and the context engine 204.

In other embodiments, the ESG VM 110 may be implemented on an overlay network, which is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an L2 overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 data messages over L3 networks.

Figure 3:
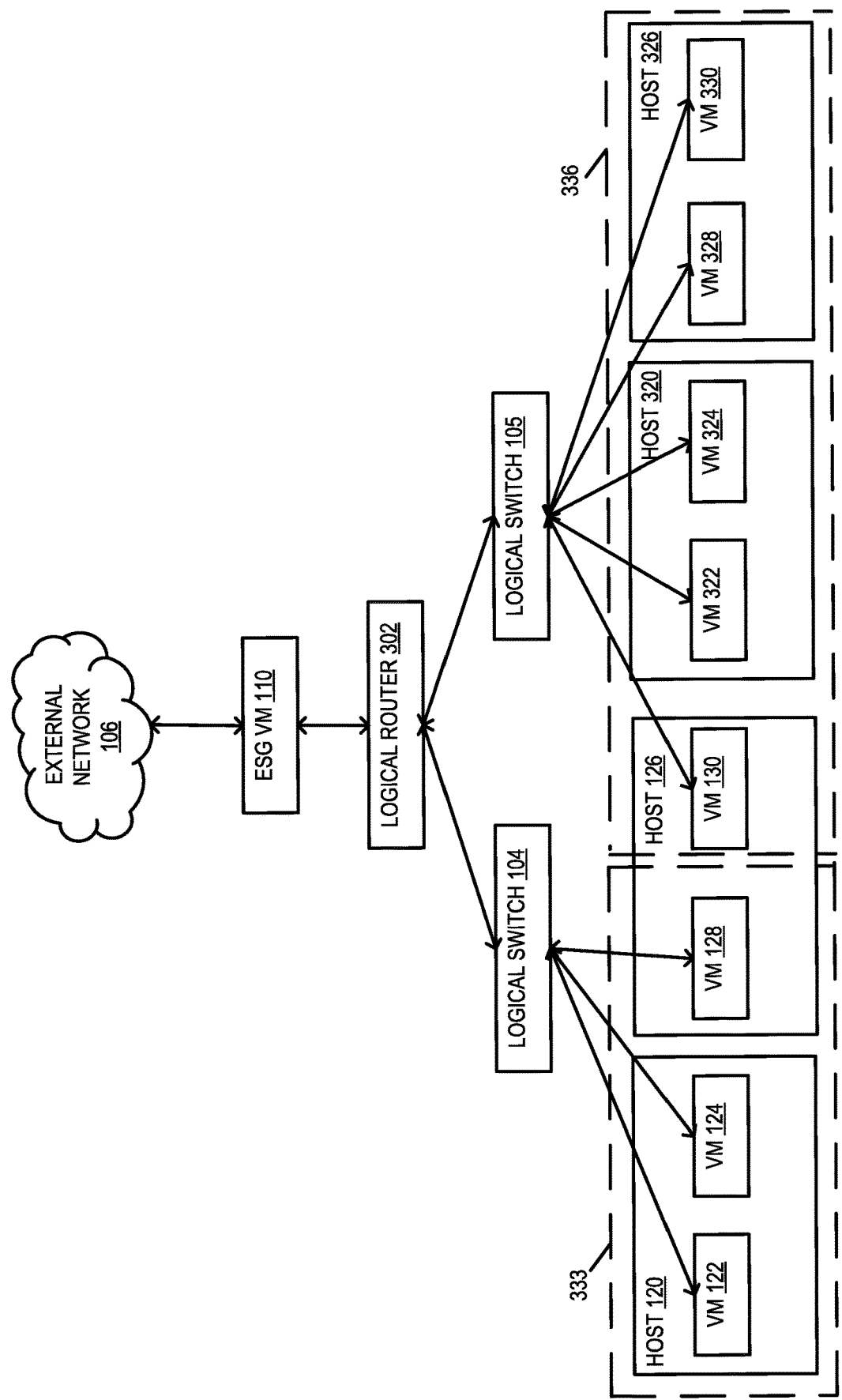
FIG. 3 is a block diagram depicting a system for executing for performing identity-based firewall operations with logical network overlays, according to embodiments of the present disclosure.

With reference now to FIG. 3, an overlay network 300 is provided. As shown, the ESG VM 110 (e.g., the ESG VM 110 from FIGS. 1 and 2) communicates with logical switches 304 and 306 via logical router 302. The logical switches 304 and 306 each provide a logically isolated Layer 2 overlay network, e.g., for separate (different) tenants. As shown, VMs 122-128 belong to a first tenant (e.g., tenant 333) and are connected together through logical switch 304. Similarly, VM 130 and VMs 322-330 belong to a second tenant (e.g., tenant 336) and are connected together through logical switch 306. It should be understood that logical switches 304 and 306 shown in FIG. 3 are conceptual entities, and each logical switch shows a particular tenant's view of the overlay network 300. For example, logical switch 304 may be implemented by flow table entries configured into virtual switches 123, 129 shown in FIG. 1. Each virtual switch 123, 129 can be considered software implementations of a physical Layer 2 switch with forwarding table entries populated using information from network manager and control planes 132. Collectively, the forwarding table entries in one or more virtual switches distributed across one or more hosts implement each logical switch.

Thus, while in FIG. 1, each ESG VM in ESG VM cluster 108 applied and enforced the same firewall rules across the virtual network 104, FIG. 3 provides an example wherein an ESG VM (e.g., the ESG VM 110) is used to enforce a first set of firewall rules for the logical network 104 of tenant 333 and a second set of firewall rules for the logical network 105 of tenant 336. Therefore, while VMs 128 and 130 are executed on the same host (the host 126), the VM 128 is part of the logical network of tenant 333, and the VM 130 is part of the logical network of tenant 336. As such, the ESG VM 110 is able to apply the first set of firewall rules for the logical network of tenant 333, which includes the VM 128, and the ESG VM 110 is able to apply the second set of firewall rules for the logical network of tenant 336, which includes the VM 130. Thus, while a cluster of ESG VMs (e.g., the ESG VM cluster 108 in FIG. 1) can enforce a set of firewall rules for a particular network, each individual ESG VM may enforce a difference set of firewall rules for a plurality of virtual networks.

Figure 4:
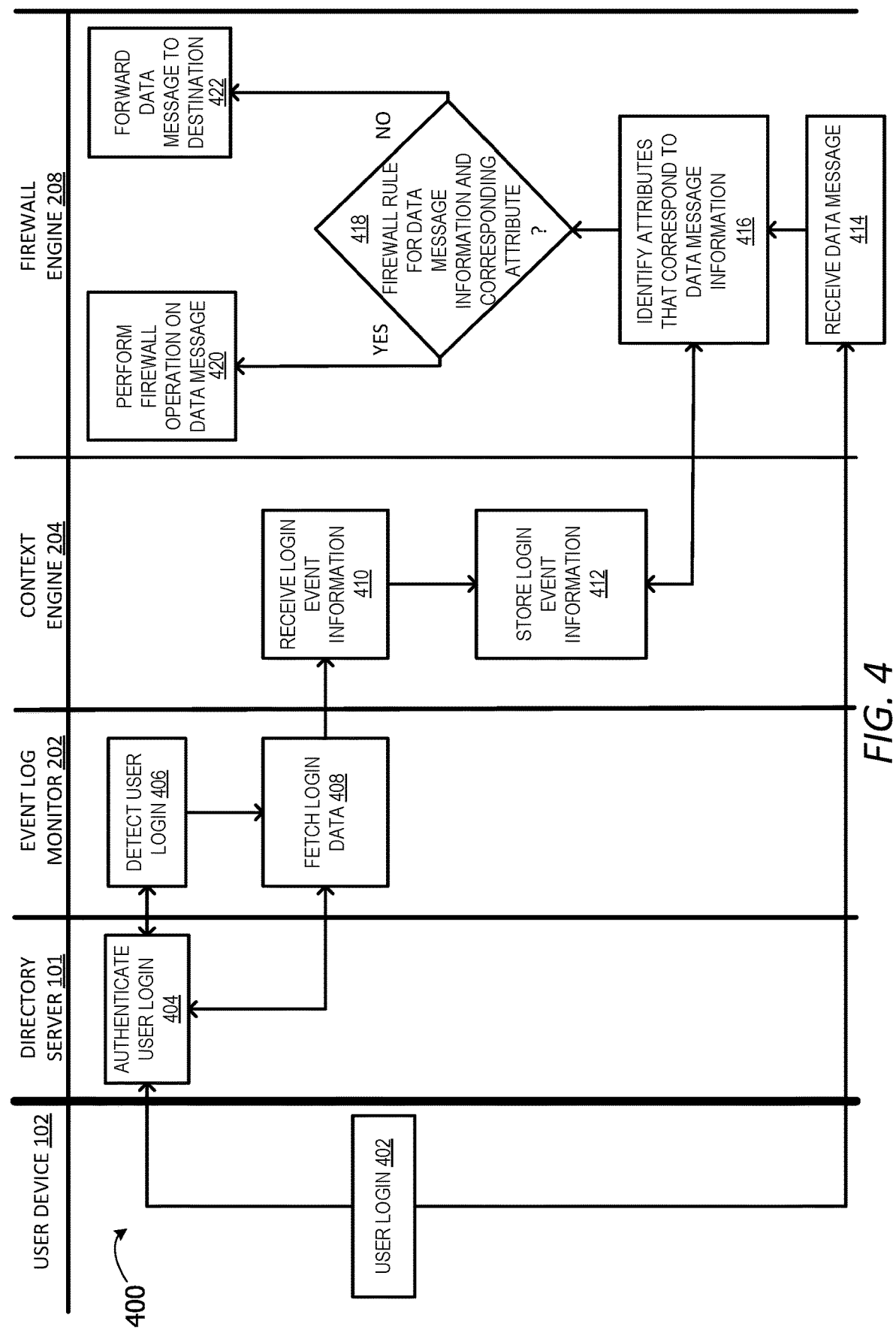
FIG. 4 is a swim lane diagram that illustrates a method for performing firewall operations on an edge service gateway virtual machine, according to embodiments of the present disclosure.

With reference now to FIG. 4, a swim lane diagram illustrating a process 400 for performing firewall operations on the ESG VM 110 is provided. The process 400 initiates at 402 when a user logs in to a network (e.g., the virtual network 104) from the user device 102 using a directory service running on the directory server 101, which authenticates the user at 404. In one embodiment, the user device 102 is a physical desktop computer, and in another embodiment, the user device 102 is a virtual machine or a container. In the embodiments described herein, whether the user device 102 is a physical desktop, a virtual machine, or a container, the user device 102 may not include a guest agent executing thereon that enables the identification of the user login or the capturing of contextual information from the user login. Thus, to enable the ESG VM 110 to detect the login event and capture contextual information, such as a user ID from the login event, the ESG VM 110 includes the event log monitor 202 that polls the directory server 101. At 406, the event log monitor 202 detects, from the directory server 101, the login event on the user device 102. At 408, the event log monitor 202 obtains, from the detected login event, login event information comprising an identifier that identifies the user. Thus, embodiments described herein enable an ESG VM 110 to identify a login event and capture contextual information from the login event without a guest agent being present on the user device 102. In some embodiments, the log in event information includes one or more of the following: a five-tuple identifier, a user ID, and a group identifier.

At 410, the context engine 208 receives the login event information from the event log monitor 202 and stores the login event information in an attribute table (e.g., the attribute table 210 in the memory area 206) at 412. At 414, the firewall engine 208 receives a data message from the user device 102. As explained above, the firewall engine 208 is implemented on the ESG VM 110, which enables the ESG VM 110 to enforce firewall rules for the network 104. At 416, the firewall engine 208 accesses the attribute table 212 to identify context attributes in the attribute table that correspond to data message information. At 418, the firewall engine 208 determines whether one or more portions of the data message information and corresponding context attributes match a firewall rule. At 420, when the firewall engine 208 determines that one or more portions of the data message information and corresponding context attributes match a firewall rule, the firewall engine 208 enforces a corresponding firewall operation on the data message. However, at 422, when the firewall engine 208 does not determine that one or more portions of the data message information and corresponding context attributes match a firewall rule, the firewall engine 208 does not enforce a firewall operation on the data message, and allows the data message to proceed to an intended destination.

Figure 5:
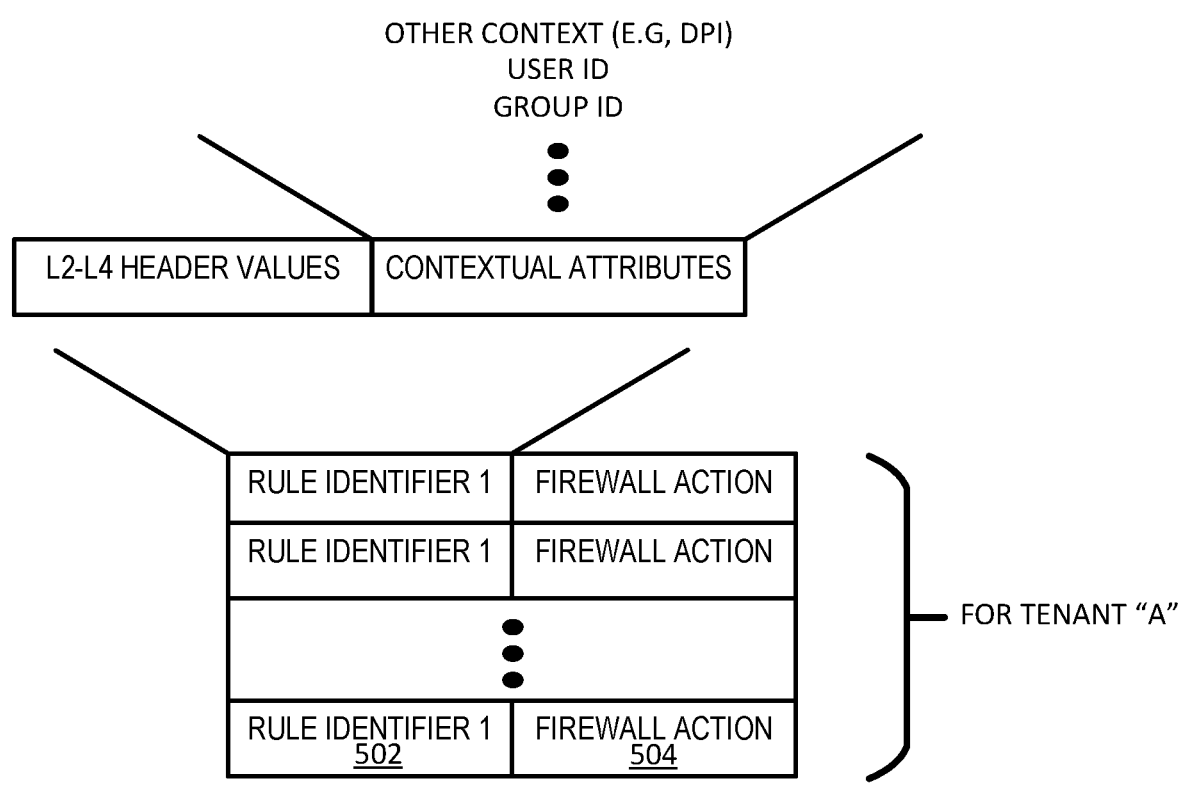
FIG. 5 is a block diagram that illustrates examples of firewall rules, according to embodiments of the present disclosure.

With reference now to FIG. 5, several examples of firewall rules that can be specified in terms of not only L2-L4 parameters, but also in terms of context attributes are provided. As shown, each firewall rule includes a rule identifier 502 and a firewall action parameter 504 that defines a firewall action. In some embodiments, the firewall action parameter 504 can be any one of the traditional firewall actions, such as Allow, Drop, Re-Route, etc. Each rule identifier 502 specifies one or more data tuples that can be used to identify a rule that matches a data message flow. As shown, a rule identifier can include in some embodiments any L2-L4 parameters (e.g., source IP address, source port, destination port, protocol, etc.). One or more of these parameters can be virtual parameters (e.g., a VIP of a destination cluster) or a logical identifier (e.g., a logical network identifier). In some embodiments, a rule identifier can also include context attributes, such as application name, application version, user ID, and group ID. In some embodiments, the firewall engine 208 searches the attribute table 210 and the firewall rules 212 by comparing one or more message attributes (e.g., five-tuple header values, context attributes) with the rule identifiers 502 to identify the highest priority rule with a matching rule identifier.

Figure 6:
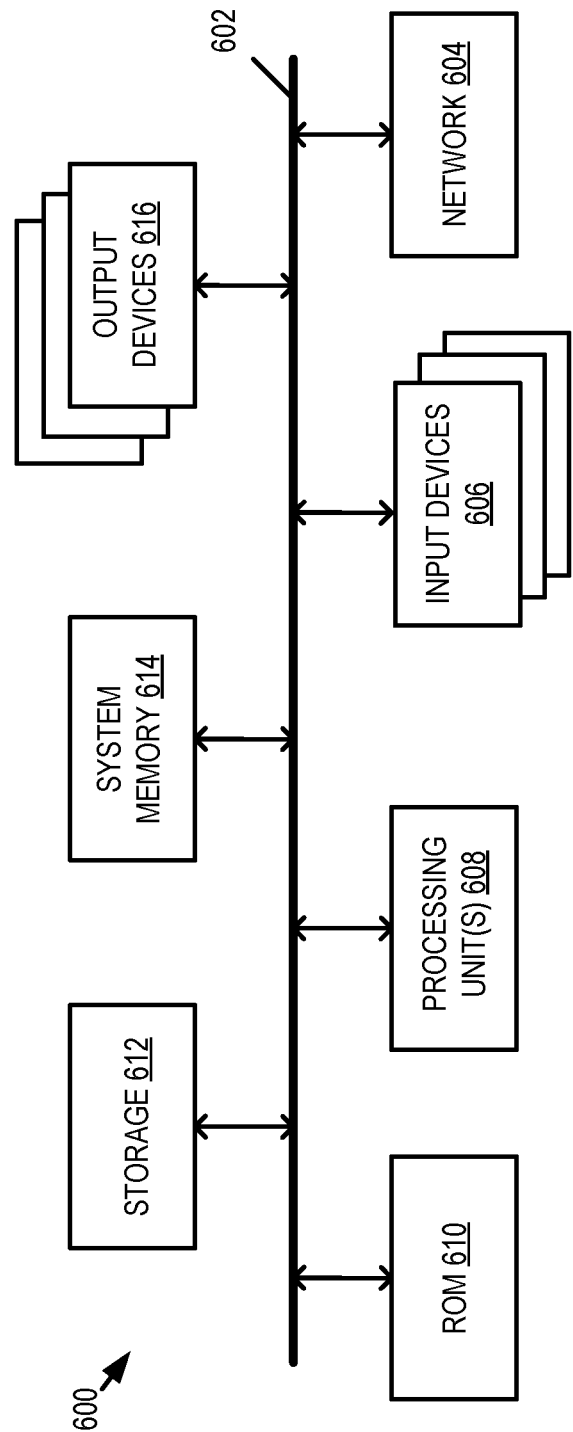
FIG. 6 illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above described processes. This computer system includes various types of non-transitory machine readable media and interfaces for various other types of machine readable media. Computer system 600 includes a bus 602, processing unit(s) 608, a system memory 614, a read-only memory 610, a permanent storage device 612, input devices 606, and output devices 616.

The bus 602 collectively represents all system, peripheral, and chipset buses that communicatively connect the numerous internal devices of the computer system 600. For instance, the bus 602 communicatively connects the processing unit(s) 608 with the read-only memory 610, the system memory 614, and the permanent storage device 612.

From these various memory units, the processing unit(s) 608 retrieve instructions to execute and data to process in order to execute the processes of the invention. The processing unit(s) may be a single processor or a multi-core processor in different embodiments. The read-only-memory (ROM) 610 stores static data and instructions that are needed by the processing unit(s) 610 and other modules of the computer system. The permanent storage device 612, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 612.

Other embodiments use a removable storage device (such as a floppy disk, flash drive, etc.) as the permanent storage device. Like the permanent storage device 612, the system memory 614 is a read-and-write memory device. However, unlike storage device 612, the system memory 614 is a volatile read-and-write memory, such a random access memory. The system memory stores some of the instructions and data that the processor needs at runtime. In some embodiments, the invention's processes are stored in the system memory 614, the permanent storage device 612, and/or the read-only memory 610. From these various memory units, the processing unit(s) 608 retrieve instructions to execute and data to process in order to execute the processes of some embodiments.

The bus 602 also connects to the input and output devices 606 and 616. The input devices enable the user to communicate information and select commands to the computer system. The input devices 606 include alphanumeric keyboards and pointing devices (also called "cursor control devices"). The output devices 616 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 602 also couples computer system 600 to a network 604 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, it should be understood that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, it should be understood that the invention is not to be limited by the foregoing illustrative details, but rather is to be defined by the appended claims.

What is claimed is:

1. A system comprising:
   a computing device;
   a directory server executing a directory service thereon;
   a network;
   one or more edge service gateway (ESG) virtual machines (VM) that monitor traffic for the network, each of the one or more ESG VMs comprising:
     an event log monitor configured to:
       poll the directory service for a login event on the computing device;
       detect, from polling the directory service, the login event on the computing device; and
       obtain, from the detected login event, login event information comprising an identifier that identifies a user;
     a context engine configured to:
       receive the login event information from the event log monitor; and
       store the login event information comprising the identifier as one or more context attributes in an attribute table; and
     a firewall engine configured to:
       determine attributes of a data message received by the ESG VM;
       compare the data message attributes with the one or more context attributes stored in the attribute table; and
       identify a firewall rule to enforce on the data message based on the comparing, wherein, based the identified firewall rule, the firewall engine causes the data message to be dropped or forwarded.

2. The system of claim 1, wherein firewall engine is further configured to compare a five-tuple identifier from the data message with attributes in the attribute table to determine the data message corresponds to the one or more context attributes.

3. The system of claim 1, wherein the computing device is a personal computer.

4. The system of claim 1, wherein the login event comprising a user logging into the network through a directory server.

5. The system of claim 4, wherein the event log monitor is further configured to poll the directory server for login events.

6. The system of claim 1, wherein the network is a logical overlay network.

7. The system of claim 1, wherein the computing device does not execute a guest-introspection (GI) agent thereon.

8. A method for performing firewall operations on an edge service gateway (ESG) virtual machine (VM) that monitors traffic for a network, the method comprising:
   polling a directory service for a login event on a computing device;
   detecting, from polling the directory service, the login event on the computing device;
   obtaining, from the detected login event, login event information comprising an identifier that identifies a user associated with the login event;
   storing the login event information comprising the identifier as one or more context attributes in an attribute table; and
   applying a firewall rule to a data message that corresponds to the one or more context attributes.

9. The method of claim 8, further comprising comparing a five-tuple identifier from the data message with attributes in the attribute table to determine the data message corresponds to the one or more context attributes.

10. The method of claim 8, wherein the computing device is a hardware computing device.

11. The method of claim 8, wherein the computing device is a virtual machine or a container.

12. The method of claim 8, wherein the login event information further comprises one or more of the following: a five-tuple identifier and a group identifier.

13. The method of claim 12, wherein the directory service is an active directory service, and wherein the user group identifier is a group identifier in an active directory.

14. The method of claim 8, wherein the login event is a request to access an application in the network monitored by the ESG VM.

15. An edge service gateway (ESG) virtual machine (VM) that monitors traffic for a network, the ESG VM stored in memory on a computing device, the ESG VM comprising:
   an event log monitor configured to:
     poll the directory service for a login event on the computing device;
     detect, from polling the directory service, the login event on the computing device; and obtain, from the detected login event, login event information comprising an identifier that identifies the user;
a context engine configured to:
receive the login event information from the event log monitor; and
store the login event information comprising the identifier as one or more context attributes in an attribute table; and
a firewall engine configured to:
receive a data message;
determine the data message corresponds to the one or more context attributes stored in the attribute table;
identify a firewall rule to enforce on the data message based on the determining; and
enforce the firewall rule on the data message.

16. The ESG VM of claim 15, wherein firewall engine is further configured to compare a five-tuple identifier from the data message with attributes in the attribute table to determine the data message corresponds to the one or more context attributes.

17. The ESG VM of claim 15, wherein the computing device is a personal computer.

18. The ESG VM of claim 15, wherein the computing device is a virtual machine or a container.

19. The ESG VM of claim 15, wherein the ESG VM further comprises a memory area for storing firewall rules and the attribute table.

20. The ESG VM of claim 15, wherein the login event information further comprises one or more of the following: a five-tuple identifier and a group identifier.

* * * * *